Figure 1:
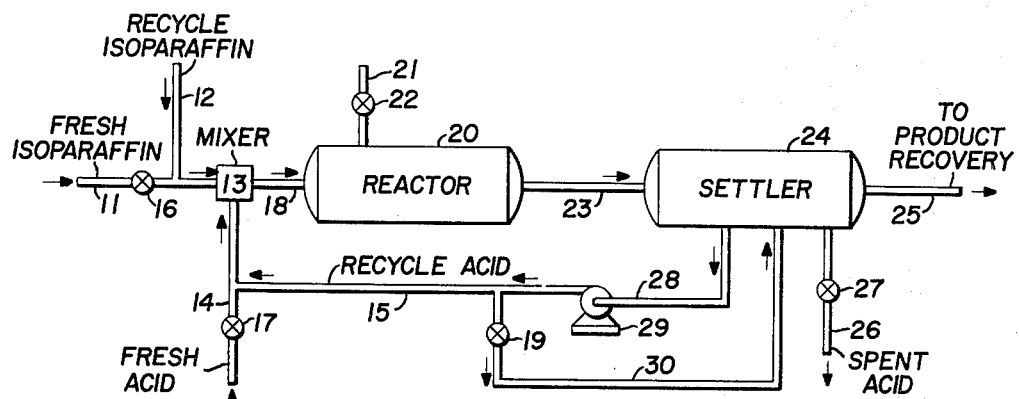

Harvey E. W. Burnside
Howard G. Codet
Charles E. Jahnig
Ivan Mayer

Inventors

By *Byron G. Dimmick* Attorney

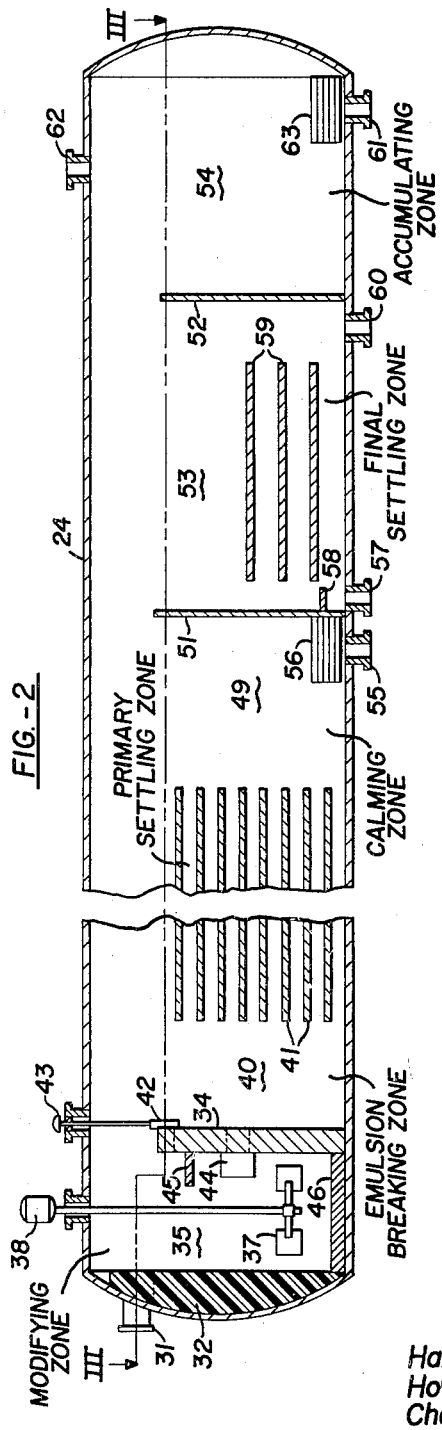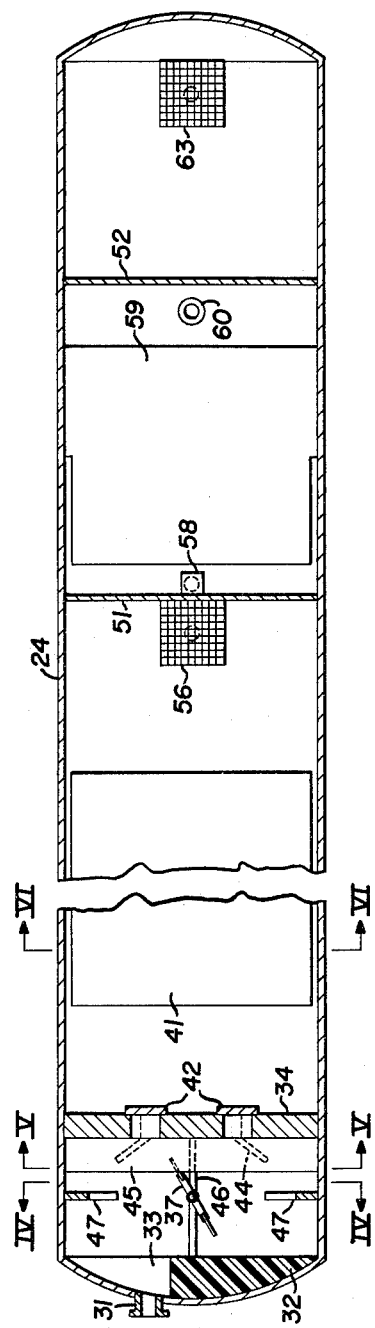

United States Patent Office 3,007,984
Patented Nov. 7, 1961

3,007,984
SEPARATION OF HYDROCARBON-ACID EMULSIONS INTO THEIR COMPONENTS
Harvey E. W. Burnside, Locust Point, Howard G. Codet, Westfield, Charles E. Jahnig, Rumson, and Ivan Mayer, Summit, N.J., assignors to Esso Research and Engineering Company, a corporation of Delaware
Filed Mar. 15, 1960, Ser. No. 15,242
9 Claims. (Cl. 260—683.62)

The present invention concerns improvements in the separation of emulsions of liquid hydrocarbons and liquid acid catalysts into the emulsion constituents. It is particularly directed to improved methods and apparatus for separating reaction product from acid catalyst in an emulsion alkylation process wherein branched chain hydrocarbons suitable as automotive and aviation fuel components are prepared by reaction of olefins with isoparaffinic hydrocarbons.

This application is a continuation-in-part of copending application Serial No. 586,762, filed May 23, 1956, by the same applicants and now abandoned.

In the alkylation of olefinic material with isoparaffins a particular problem that arises is that of preventing or minimizing the polymerization of the olefins or their degradation into sludge by contact with the alkylation catalyst. A desirable way to solve this problem is to conduct the catalytic alkylation reaction under conditions that are designed to avoid, as much as possible, intimate contact of the olefins with the catalyst material in the comparative absence of isoparaffins. This may be accomplished by providing a substantial excess of isoparaffins in the reaction zone and by introducing the olefinic material in successive increments into a continuous series of reaction zones or stages which contain previously emulsified mixtures of isoparaffin, alkylation catalyst and reaction products.

In conventional alkylation procedures product recovery is effected by withdrawing the emulsion from the reaction zone or zones and separating it into its hydrocarbon and liquid acid components. The separated hydrocarbon phase, which consists chiefly of alkylation product and unreacted paraffins, is sent to a product recovery system while the major portion of the separated acid is recycled to the reaction zones. As the emulsion separation step requires an appreciable period of time, if any olefins remain dissolved in the acid phase, they will undergo the competing polymerization and sludge forming reactions in both the separation zone and the lines recycling the acid phase to the reaction zone. Consequently, polymers comparatively low in octane number may find their way into the alkylate product, reducing the quality thereof. The sludge remains in the acid, and acid consumption is increased. It is thus desirable to perform the emulsion separating step as rapidly as possible in order to minimize the time during which there is a comparative absence of isoparaffins. Rapid separation is also desirable to reduce the size of the settling equipment required for a given reaction throughput capacity.

It is one object of the present invention to provide an improved process and apparatus for separating the product emulsion rapidly so as to ensure maximum yield and quality of the desired products.

It is a further object of the invention to provide improved methods and apparatus for the rapid and efficient separation of an emulsified mixture of hydrocarbon and liquid acid catalyst into its component parts.

In accordance with the present invention the emulsion of acid and hydrocarbon that is to be separated into its components is charged to a well-mixed emulsion modification zone which is in fluid communication with a relatively non-agitated emulsion breaking zone so that hydrocarbon that separates from the emulsion in the latter zone can be recycled to the emulsion modification zone to bring about the desired modification of the emulsion and thereby facilitate separation of the acid catalyst from the hydrocarbons. The effect produced is that the reaction emulsion, in which the acid catalyst constitutes more than 50 percent of the emulsion, is automatically mixed with sufficient hydrocarbon in the emulsion modification zone to reduce the acid content to about 10 to 30 percent. Modified emulsion is withdrawn to the emulsion breaking zone where the major separation of hydrocarbon and acid occurs. A particular feature of the invention is provision for automatic recycle of separated hydrocarbon to the modification zone by density difference forces.

An additional particular feature of the invention is the provision of novel apparatus for effecting improvements in the rate of separation of the reaction emulsion into its acid and hydrocarbon components.

Although the invention is particularly described with reference to the alkylation of isobutane with butylenes, in the presence of sulfuric acid as a catalyst, it is not intended that the invention be limited to this particular alkylation reaction, as the same principles can be applied to related reactions using other isoparaffins such as isopentane and other olefins such as propylene or amylenes. Likewise, although sulfuric acid is typical of the acid catalyst that may be employed in practicing the invention, it is intended that the invention also be used with other suitable liquid catalysts, including mixtures of sulfuric and phosphoric acids, hydrofluoric acid, aluminum chloride-boron fluoride complexes and the like. Moreover, the invention is not limited to the separation of alkylation emulsions but may likewise be applied to emulsions resulting from acid treating operations, isomerization reactions, and the like.

Figure 4:
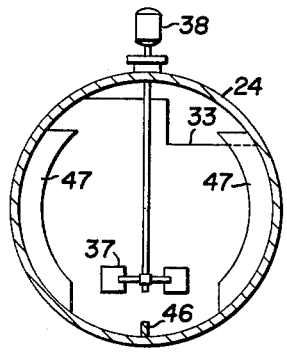
Figure 5:
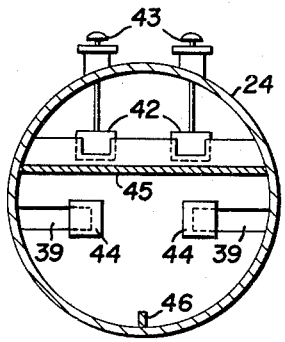
Figure 6:
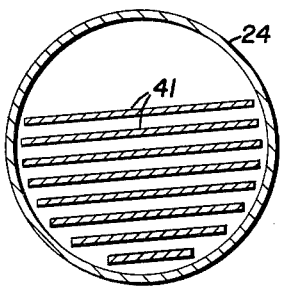
Figure 7:
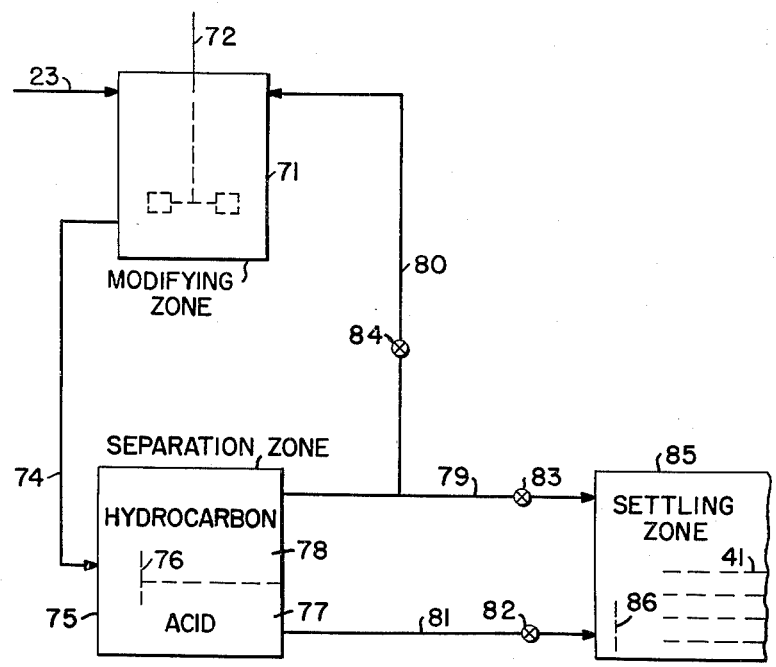

The nature and objects of the invention will be more readily understood when reference is made to the accompanying drawings in which:

FIGURE 1 is a diagrammatic flow plan for accomplishing the alkylation process of the present invention;
FIGURE 2 is an elevational view in broken section showing one embodiment of a reaction product settler that forms a particular feature of the present invention;
FIGURE 3 is a sectional plan view taken on line III—III of FIGURE 2;
FIGURE 4 is a sectional view taken on line IV—IV of FIGURE 3;
FIGURE 5 is a sectional view taken on line V—V of FIGURE 3;
FIGURE 6 is a sectional view taken on line VI—VI of FIGURE 3; and
FIGURE 7 is a schematic diagram illustrating an alternative form of apparatus that may be employed in practicing the invention.

As stated, the invention will be particularly described with reference to the alkylation of isobutane with butylene in the presence of concentrated sulfuric acid as catalyst. Referring now to FIGURE 1 in detail, the general features of the alkylation process may be understood.

A reaction vessel 20 is employed which may be of such size as is required by the volume of the material to be handled and by the residence time necessary for effecting the alkylation reaction. Means are provided for introducing the reacting materials into the vessel and for removing reaction products therefrom. It is preferred for proper control of the reaction that the acid and isoparaffin be mixed before entering the reactor. Thus an isobutane feed made up of fresh isobutane entering through line 11 and recycle isobutane entering through line 12 is conducted to a mixing zone 13 where it is mixed with sulfuric acid catalyst. The recycle isobutane is obtained from a product recovery system, which is not shown in the figure. The sulfuric acid catalyst enters the mixing zone through fresh acid line 14 and recycle acid line 15. Once the operation has been started a major supply of acid will be recycle acid from the product settler with small amounts of acid being added through line 14 as needed. The feed rates of fresh isobutane and fresh acid are controlled by valves 16 and 17, respectively.

The mixture of acid and isoparaffin that is prepared in mixing zone 13 is conducted through line 18 into reactor 20 to which a stream of olefins, e.g. isobutylene is fed by means of line 21, the rate of feed being controlled by valve 22. The mixture of acid, isoparaffin and olefin is maintained as an emulsion in reactor 20 by any suitable means, for example by a mechanical stirrer, by recirculation of the emulsion at high turbulence, or by other means known to the art. Suitable provision may be made to maintain the reaction temperature in the reactor at a desired level, say from 30° to 60° F.

A portion of the emulsion is continuously withdrawn from reactor 20 through line 23 and sent to the product settler 24 which constitutes an important feature of the invention as will be described in detail below. Spent acid catalyst from the product settler is discarded through line 26, controlled by valve 27, while recycle acid is removed from the settler by line 28 and returned by means of pump 29 through the recycle line 15 to the mixing zone 13 as previously described. A small portion of the recycle acid stream leaving the pump 29 is diverted through line 30, controlled by valve 19, to another section of the settler to aid in final separation of acid from product as will be explained later. That acid then makes up the spent acid stream.

The reaction product leaves the settler through line 25 and is sent through the conventional caustic and water wash steps and a subsequent fractionation step. Isoparaffin recovered from the product is sent back to the reactor through line 12 as previously described.

As discussed previously, an important feature of the present invention is the method provided for modifying the emulsion after it leaves the reactor and the provision of novel means for effecting such modification as well as of novel settling means for separating the reaction product from the acid catalyst. A preferred embodiment of apparatus for practicing the emulsion modification and acid separating steps is depicted in FIGURES 2 to 6.

Referring in particular to FIGURES 2 and 3, it will be seen that an emulsion modifying zone, an emulsion breaking zone and at least two settling zones are all provided within the settler 24, which is a horizontal cylindrical vessel. The product emulsion from the reactor enters the settling vessel through an inlet 31. A vertical partition 34 positioned adjacent the inlet end of the vessel defines within the vessel an emulsion modifying zone 35 which is provided with a stirrer 37 having two or more vertically disposed blades and driven by a motor 38. A quantity of fill material 32 occupes the inlet end of the settler to provide a vertical wall for the emulsion modifying zone. A flat surface 33 is provided above the fill material adjacent the inlet 31 to serve as a flash pan for removing vapors from the entering emulsion. Elements 46 and 47 constitute a central ridge baffle and auxiliary vertical baffles, respectively, which serve the purpose of ensuring more efficient mixing in the emulsion modifying zone.

The vertical partition 34 has fluid flow means establishing fluid communication below the top of the partition between the emulsion modifying zone and an emulsion breaking zone 40 which is defined by the partition 34 and a plurality of flat settling baffles 41, disposed in a generally horizontal position. As shown in FIGURES 3 and 5 the fluid flow means comprise one or more openings or passageways 39. The top of the vertical partition 34 is provided with a pair of vertically adjustable weirs 42 whose height can be adjusted by means of the raising or lowering mechanism 43 in order to regulate the amount of separated hydrocarbons that will be recycled from the emulsion breaking zone to the emulsion modifying zone by flowing over the top of partition 34. The adjustable weirs can also be set to cut off the hydrocarbon recycle completely if this is ever required. In place of the pair of notches and weirs, a single large notch and weir could be used.

The partition 34 is also fitted with deflectors 44 that are arranged at an angle to the plane of the partition adjacent the openings 39 so as to be interposed in the path of fluid flow and thereby minimize disturbance of the emulsion breaking zone by the stirring action occurring in the emulsion modifying zone. A horizontally disposed deflector 45 is also attached at right angles to the partition 34 above the slots 39 to prevent "short circuiting" of the stream of hydrocarbons flowing over the top of the partition from the emulsion breaking zone to the emulsion modifying zone.

Beyond the primary settling zone provided by the generally horizontal baffles 41 is an acid-disengaging zone or calming zone 49 defined by the latter baffles and a second vertical partition 51 whose top edge determines the height of the liquid level that will be attained in the settling vessel. A third vertical partition 52 defines with partition 51 a final settling zone 53. Vertical partition 52 also defines with the end of the settling vessel an accumulating zone 54.

Acid that accumulates in the calming zone 49 is removed through outlet 55 to be recycled to the lead stage of the reactor system as discussed previously in connection with FIGURE 1. To minimize agitation in the calming zone, an anti-vortex baffle 56 is positioned over the outlet 55.

As mentioned previously, a portion of the acid being recirculated through line 15 is diverted through inlet 57 into the final settling zone 53, where final separation of acid from hydrocarbon takes place. This final settling is further enhanced by the horizontally arranged baffles 59. A baffle 58 supported on the partition 51 above the inlet 57 minimizes agitation in the final settling zone. The acid that accumulates in the bottom of the final settling zone is removed through outlet 60 as spent acid. The separated hydrocarbon flows from final settling zone 53 over the top of the partition 52 into the accumulating zone 54 and is removed from the latter zone through outlet 61. The anti-vortex baffle 63 above the latter outlet may or may not be necessary. Vapors that separate from the accumulated product are removed overhead through vapor outlet 62.

In a representative alkylation reaction wherein butylenes are alkylated with isobutane in the presence of sulfuric acid of 90 to 95% strength to produce about 10,000 barrels per stream day (b./s.d.) of alkylate, about 5700 b./s.d. of olefins and about 6700 b./s.d. of fresh isobutane will be consumed. As it is preferred to maintain a substantial molar excess of isoparaffin to the olefin in the alkylation reaction considerable isobutane from the reaction product is recycled to the reactor so that the reactor actually handles about 14,000 b./s.d. of isobutane, exclusive of that required for autorefrigeration. Likewise, although the above quantities of hydrocarbon materials may require about 84 tons of fresh 98% sulfuric acid per stream day, the actual amount of acid flowing through the system per day will be much greater since the ratio of recycle acid to fresh acid may be of the order of 200 to 1 or more.

In an emulsion type alkylation reaction it is normally desirable to operate the process with a very high proportion of acid in the reaction zone. Tests have shown that in order to ensure stability of hydrocarbon-acid emulsions, the acid phase should make up at least half of the emulsion volume. Additional tests have shown that it is quite difficult to obtain homogeneous emulsions at reasonable power inputs in mixing zones containing less than about 60% acid. Thus, in order to assure smooth and efficient operation the acid catalyst in the emulsion alkylation reactor should preferably make up 60 to 70 percent of the volume of the emulsion of acid and hydrocarbon. One disadvantage, however, of high acid content emulsions is that they have low settling rates and hence if settlers of conventional design are employed, exceedingly large settling equipment is required. This disadvantage is overcome in the present invention by the use of the settling system described above in connection with FIGURES 2 to 6 inclusive.

Referring again to FIGURE 2, the emulsion from the reactor enters the emulsion modification zone 35 of the settling vessel 24. In this zone the emulsion mixes with sufficient hydrocarbon flowing over the top of the partition 34 from the emulsion breaking zone to reduce the acid content of the emulsion from its original 60 to 70% to about 10 to 30% acid. The modified emulsion flows through the openings or passageways 39 into the emulsion breaking zone 40 where separation occurs into an upper phase comprising substantially acid-free hydrocarbon and a lower phase of acid. The level of the interface between separated hydrocarbon and separated acid will be maintained somewhere near, and preferably slightly below, the level at which the modified emulsion enters the emulsion breaking zone. As already stated, a considerable proportion of the hydrocarbon separated in the emulsion breaking zone flows back over the top of the partition 34 to reduce the acid concentration of the emulsion entering the modification zone 35. Flow of modified emulsion from zone 35 into the emulsion breaking zone 40 through the openings 39 occurs because of density differences on the two sides of the partition. Thus hydrocarbon recycle to the emulsion modifying zone is accomplished automatically without the use of an external pump.

The magnitude of hydrocarbon flow over the top of the partition 34 can be appreciated from the following figures. Assume that the entering emulsion is 60 percent acid and that the emulsion is to be modified to one containing 20 percent acid. For every three volumes of acid in the original emulsion there are two volumes of hydrocarbon. To modify the emulsion to the 20 percent acid level there must be 12 volumes of hydrocarbon for each 3 volumes of acid. Thus 10 volumes of hydrocarbon must flow over the partition to augment the 2 volumes of hydrocarbon in the original emulsion. It is thus seen that for every volume of emulsion entering the settler, say 30,000 b./d., twice that volume of hydrocarbon (i.e. 60,000 b./d.) must flow from the emulsion breaking zone over the partition into the emulsion modifying zone.

Further separation between hydrocarbon and acid occurs as the materials flow through the primary settling zone containing the plurality of essentially horizontal baffles 41. The function of the latter baffles is to shorten the distance that a particle of acid or of hydrocarbon has to travel before encountering a body of the same material with which it can coalesce, thus decreasing the settling time. It will be noted that the baffles 41 are inclined slightly from the horizontal, say about 5 degrees, in the direction of the width of the vessel, as shown in FIGURE 6. This facilitates movement of the separated hydrocarbon and acid layers from between the baffles, the former moving to the high side of the baffles, and the latter to the low side. The hydrocarbon then rises to the top of the vessel in the space between the vessel wall and the high side of the baffles, and the acid flows downward in the opposite space.

The separated hydrocarbon and acid phases then enter the acid disengaging or calming zone 49 from which acid is removed through outlet 55 while hydrocarbon flows over the top of partition 51 into the final settling zone 53. As previously explained, a small proportion of the acid removed from the calming zone through outlet 55 is diverted into the bottom of the final settling zone through inlet 57 to facilitate the final separation of acid from hydrocarbon, and the acid from the final settling zone is removed through spent acid outlet 60 and discarded. The reaction product from which the acid has been separated flows from the final settling zone over partition 52 into the accumulating zone 54 from which it is removed for fractionation and caustic washing as in conventional practice.

An alternative arrangement of apparatus for effecting the emulsion modification step and the automatic recycle of separated hydrocarbon to the emulsion modifying zone is shown schematically in FIG. 7. An emulsion modifying zone 71 is provided having stirring means 72 as in the embodiment previously described. Suitable baffling may also be provided in the modifying zone to enhance the mixing action as in the earlier described embodiment but is not shown here. Emulsion enters through line 23 and is modified by hydrocarbon entering through line 80. The modified emulsion is conducted by means of line 74 from a lower portion of the modifying zone to a lower portion of an emulsion separation or breaking zone 75 positioned below the modifying zone. In the separation zone separated hydrocarbon collects as an upper layer and separated acid as a lower layer. A baffle 76 may be positioned adjacent the inlet from line 74 to minimize disturbance of the separated layers. Separated acid is removed through line 81 and separated hydrocarbon is removed through line 79, both streams being conducted to a settling zone 85 similar to the primary settling zone containing baffles 41 as shown in FIGS 2-6.

A portion of the separated hydrocarbon in line 79 is returned to the modifying zone through line 80. Since the density of the material in line 74 is greater than that in line 80 recycle flow will occur automatically by density difference forces.

The height of the interface (indicated by the dashed line) between the acid and hydrocarbon in zone 75 may be adjusted by the proper setting of valve 82 in line 81. Preferably the interface is maintained at about the level where line 74 enters, or slightly below it, as shown. The interface will not necessarily be sharp but will generally include an intermediate layer of emulsified material. The amount of hydrocarbon recycled to the modifying zone may be regulated by proper setting of values 83 and 84.

The remaining portions of the settler apparatus beyond the generally horizontal baffles 41 may be similar in all respects to the corresponding apparatus in FIGS. 2–6.

The mechanism by which the separation of acid from hydrocarbon occurs in the operation of the present invention may involve an inversion of phases from a dispersion of hydrocarbon in acid to acid in hydrocarbon, that is, from an acid-continuous system to a hydrocarbon-continuous system. However, the principal factor is considered to be the actual reduction in acid concentration which occurs by virtue of the automatic recycle of hydrocarbon from the emulsion breaking zone to the emulsion modifying zone. The effect on the settling rate brought about by reducing the acid concentration is clearly shown by the following data that have been obtained with various concentrations of 88 weight percent spent alkylation acid in normal heptane at room temperatures.

| Volume percent acid: | Hydrocarbon out of acid settling rate, ft./min. |
| --- | --- |
| 20 | 0.428 |
| 30 | 0.386 |
| 40 | 0.066 |
| 50 | 0.0274 |
| 60 | 0.0332 |
| 69.2 | 0.0366 |

It will be seen from the above data that modification of an emulsion containing 60 to 70% acid to one containing 20 to 30% acid increases the settling rate of hydrocarbon from acid by a factor of at least 10.

It is not intended that this invention be limited to the specific embodiments presented and described herein, as many modifications thereof are possible without departing from the scope of the invention, defined in the following claims.

What is claimed is:

1. In the process of forming branched chain saturated hydrocarbons by contacting an olefin hydrocarbon with an emulsion of isoparaffinic hydrocarbon and liquid acid catalyst in a confined reaction zone under reaction conditions, and withdrawing a portion of the emulsion from said reaction zone, separating reaction product from said withdrawn emulsion and returning catalyst to said reaction zone, the improvement in the separation of liquid catalyst from hydrocarbon which comprises charging said withdrawn emulsion to an agitated emulsion modifying zone, passing emulsion from a lower portion of said emulsion modifying zone to a lower portion of a relatively quiescent emulsion breaking zone, there being fluid communication between a lower portion of said emulsion modifying zone and a lower portion of said emulsion breaking zone, and separate fluid communication between an upper portion of said emulsion modifying zone and an upper portion of said emulsion breaking zone, intermediate portions of said two zones being out of direct fluid communication, separating hydrocarbon as an upper layer in said emulsion breaking zone, transferring hydrocarbon from said upper portion of said emulsion breaking zone to said emulsion modifying zone, and mixing said withdrawn emulsion in said emulsion modifying zone with a sufficient of said transferred hydrocarbon to form a modified emulsion having a reduced acid content, whereby the separation rate of hydrocarbon from said emulsion is increased severalfold.

2. Process as defined by claim 1 where in said liquid acid catalyst comprises sulfuric acid.

3. An apparatus for separating an emulsified mixture of hydrocarbons and liquid acid catalyst which comprises a horizontally disposed elongated vessel having an inlet for emulsion, adjacent one end thereof, an outlet for acid and an outlet for hydrocarbon adjacent the opposite end thereof, a vertically disposed partition within said vessel intermediate said inlet and said outlets defining with the inlet end of the vessel an emulsion modifying zone and with the remaining portions of the vessel an emulsion breaking zone, stirring means for fluid within said emulsion modifying zone, fluid flow means passing through said partition and establishing fluid communication below the top of the partition between the emulsion modification zone and the emulsion breaking zone, and means establishing a fluid level in said emulsion breaking zone above the fluid level in said emulsion modifying zone, whereby fluid will flow from said emulsion breaking zone over said partition into said emulsion modifying zone.

4. Apparatus as defined by claim 3 including an adjustable weir adjacent the top edge of said partition to regulate said fluid flow over said partition.

5. Apparatus as defined by claim 3 including a deflector baffle adjacent said fluid flow means and interposed in the path of fluid flow whereby to minimize disturbance in said emulsion breaking zone by action of said stirring means.

6. An apparatus for separating an emulsified mixture of liquid hydrocarbon and liquid acid which comprises a horizontally disposed elongated vessel having an inlet for emulsion adjacent one end thereof, an outlet for acid and an outlet for hydrocarbon adjacent the opposite end thereof, a vertically disposed partition within said vessel adjacent the inlet end defining with the said inlet end an emulsion modifying zone, stirring means for fluid within said emulsion modifying zone, a plurality of vertically spaced generally horizontal baffles positioned within said vessel intermediate said vertical partition and said outlets, said horizontal baffles being spaced from said vertical partition to define therewith an emulsion breaking zone and from said outlets to define at least one additional zone for acid separation, said vertical partition having fluid flow means passing therethrough establishing fluid communication, below the top of the partition, between the emulsion modifying zone and the emulsion breaking zone, and a baffle means within said vessel establishing a fluid level within said emulsion breaking zone above the fluid level in said emulsion modifying zone whereby fluid will flow from said emulsion breaking zone over said partition into said emulsion modifying zone.

7. Apparatus as defined by claim 6 including at least one vertical partition between said acid outlet and said hydrocarbon outlet.

8. Apparatus as defined by claim 6 wherein said generally horizontal baffles are slightly inclined from the horizontal in the direction of the width of the vessel.

9. An apparatus for separating an emulsified mixture of liquid hydrocarbon and liquid acid which comprises a horizontally disposed elongated vessel having an inlet for emulsion adjacent one end thereof, an outlet for hydrocarbon adjacent the opposite end thereof, first and second outlets for acid intermediate said emulsion inlet and said hydrocarbon outlet and an acid inlet intermediate said acid outlets, a first vertically disposed partition within said vessel adjacent the emulsion inlet end defining with the said inlet end an emulsion modifying zone, stirring means for fluid within said emulsion modifying zone, a second vertically disposed partition within said vessel intermediate said first acid outlet and said acid inlet, a plurality of vertically spacer generally horizontal baffles positioned within said vessel intermediate said first partition and said first acid outlet. said horizontal baffles being spaced from said first partition to define therewith an emulsion breaking zone and from said second partition to define therewith a calming zone, and a third vertically disposed partition within said vessel intermediate said second acid outlet and said hydrocarbon outlet, said second and third partitions defining between them a final acid settling zone, said first vertical partition having fluid flow means passing therethrough establishing fluid communication, below the top of the partition, between the emulsion modifying zone and the emulsion breaking zone, said second partition being higher than said first partition, whereby to establish a fluid level in said emulsion breaking zone higher than the fluid level in said emulsion modifying zone.

References Cited in the file of this patent
UNITED STATES PATENTS
2,428,506    Van der Valk _____ Oct. 7, 1947